W. O. SHADBOLT.
FIFTH WHEEL FOR VEHICLES.
APPLICATION FILED MAY 27, 1914.

1,136,176.

Patented Apr. 20, 1915.

Witnesses:
Inventor:
William Oscar Shadbolt
By his Attorney
Edmond Congar Brown

UNITED STATES PATENT OFFICE.

WILLIAM OSCAR SHADBOLT, OF NEW YORK, N. Y.

FIFTH-WHEEL FOR VEHICLES.

1,136,176. Specification of Letters Patent. Patented Apr. 20, 1915.

Original application filed September 18, 1913, Serial No. 790,497. Divided and this application filed May 27, 1914. Serial No. 841,282.

*To all whom it may concern:*

Be it known that I, WILLIAM OSCAR SHADBOLT, a citizen of the United States, and a resident of the city and State of New York, have invented certain new and useful Improvements in Fifth-Wheels for Vehicles, of which the following is a specification.

My invention relates to that class of devices known as fifth wheels, which may be employed for the purpose of providing a pivotal connection between a tractor and a truck body or the like, this application being a division of application No. 790,497, filed September 18, 1913.

The object of my invention is to provide a fifth wheel which shall obviate certain of the disadvantages of such devices previously known and which shall possess certain advantages over prior devices, as hereinafter set forth.

The invention consists in the novel construction, arrangement and combination of various devices, elements and parts as shown in the accompanying drawings and hereinafter more particularly described.

Figure 1:
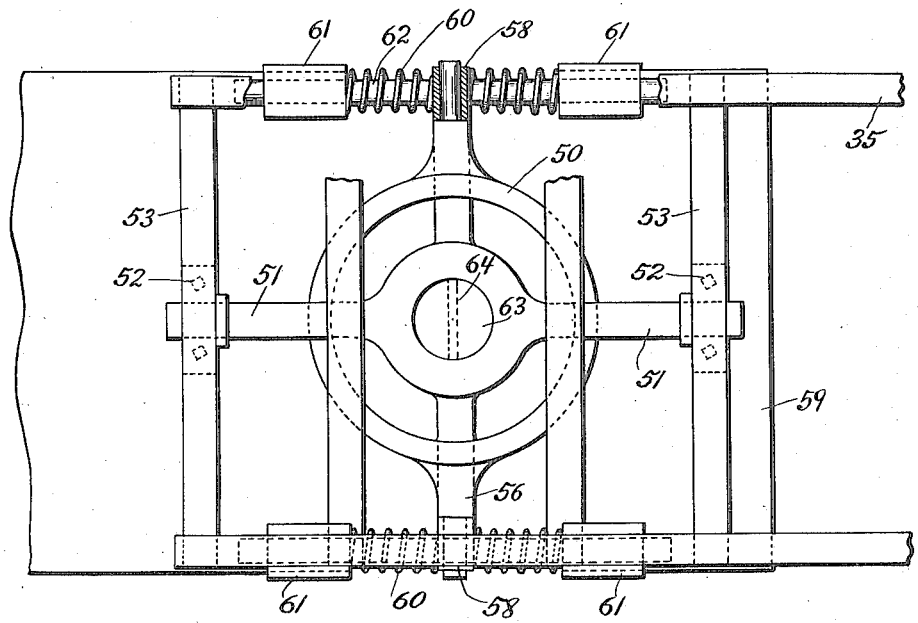
Figure 2:
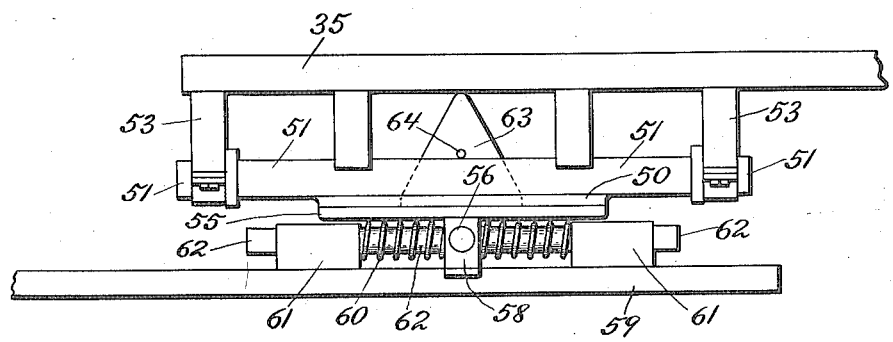

In the said drawings, Figure 1 is a plan view of my invention, and Fig. 2 is a side view thereof.

In carrying my invention into effect, in the embodiment thereof which I have selected for illustration in the accompanying drawings, and description in this specification, I provide a fifth wheel comprising an upper member 50 and a lower member 55. The upper member 50 is provided with a diametrically extending member 51, the middle part of which is split so as to assume an annular form and the ends of which project beyond the periphery of the annular member 50 and are journaled in sockets 52 in cross-bars 53 which extend across longitudinal beams 35 secured to the under side of a truck body or the like. The lower annular member 55 is provided with a diametrically extending member 56, the projecting ends of which are journaled in sockets in blocks 58 which are adapted to slide longitudinally on beams 59 fast on the frame of a tractor or the like. Any excessive or undue longitudinal movement of said blocks 58 is prevented by the helical springs 60, which bear against blocks 61 fast on the beams 59 and against the blocks 58, the said springs being kept in straight alinement by rods 62 which pass through openings in the blocks 61.

The method of securing the upper and lower members of the fifth wheel together will now be described.

From the portion of the diametrically extending member 56 which is beneath the annular opening in the longitudinally extending member 51 extends upward a conical member 63, which is in part analogous to the king-bolt in the ordinary form of fifth wheel. This conical member is adapted, when the two annular members are assembled, to project up through the annular opening in the member 51, and the said conical member 63 is provided with a transverse opening 64 above the plane of the upper surface of the annular portion of the member 32, which opening is adapted to receive a pin or bolt which when in use may serve to prevent the separation of the two annular members.

The advantages of the invention will be obvious from what has been above said, but I may mention briefly that some of the more important advantages attained are the freedom of movement of the planes of the tractor and the truck with respect to each other, it being possible for said planes to assume various angular relations with respect to each other while still remaining pivotally coupled together; the freedom from undue shock or strain to the coupling due to the shock-absorbing springs; and the important advantage of the ease with which the tractor and truck may be coupled together. When an ordinary form of fifth wheel, comprising a king-bolt is employed as a means of coupling a tractor and truck together, it is obvious that the tractor and the truck must be brought so accurately into correct relation that the opening in the upper member of the fifth wheel, on the truck, shall be exactly in register with the opening in the lower member, on the tractor, before the king-bolt can drop into its opening in the lower member. In using a fifth wheel coupling provided with a conical member as described in this specification, it is not necessary to bring the parts into such accurate relations, for it is obvious that if any part of the comparatively large opening in the upper member is brought into position over the projecting member and the truck body allowed to descend, the parts will automatically place themselves in the proper position. If then a pin or bolt is placed in the transverse opening in the projecting member the two annular members of the fifth wheel are held securely together.

Having thus described my invention what I claim as new and desire to secure by Letters Patent is as follows:

1. A fifth wheel comprising a lower member provided with lateral projections and slidably secured to devices located below the frame of a vehicle, a stop secured to said devices located below the vehicle, a spring between said lower member and said stop, an upper member having lateral projections journaled in devices secured to the under side of the vehicle, and means adapted to pivotally connect the said members together.

2. A fifth wheel comprising a lower member slidably secured to devices located below the frame of a vehicle, a stop secured to said devices below said vehicle, a spring between said lower member and said stop, an upper member secured to the under side of said vehicle, and means adapted to pivotally connect the said members together, said pivotally connecting means comprising a device projecting from one of said members, of a form decreasing in diameter from its base outward, and an opening in the other of said members adapted to engage with said projecting device.

3. A fifth wheel comprising a lower member slidably secured to devices located below the frame of a vehicle, a stop secured to said devices below said vehicle, a spring between said lower member and said stop, an upper member secured to the under side of said vehicle, and means adapted to pivotally connect the said members together, said pivotally connecting means comprising a device projecting from said lower member, of a form decreasing in diameter from its base outward, and an opening in said upper member adapted to engage with said projecting device.

In witness whereof I have hereunto signed my name this 23d day of May 1914, in the presence of two subscribing witnesses.

WILLIAM OSCAR SHADBOLT.

Witnesses:
EDMOND CONGAN BROWN,
EDMOND LIVINGSTONE BROWN.